Figure 1:
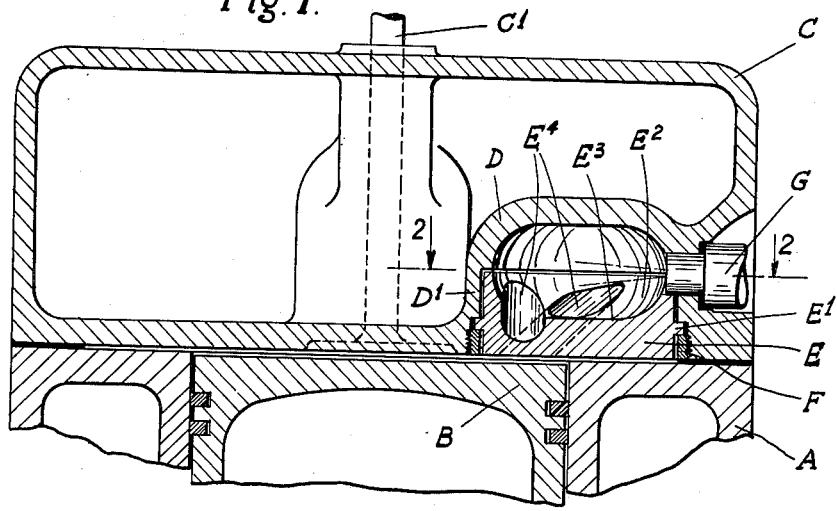

Oct. 27, 1936.  H. R. RICARDO  2,058,827
INTERNAL COMBUSTION ENGINE OF THE LIQUID
FUEL INJECTION COMPRESSION IGNITION TYPE
Filed June 28, 1935   2 Sheets-Sheet 1

Inventor
Harry R. Ricardo,
By
Katem, Cook-Morse & Grindle
Att'ys

Inventor
Harry R. Ricardo,
By Watson, Coit, Mower & Grindle
Att'ys

Patented Oct. 27, 1936

2,058,827

UNITED STATES PATENT OFFICE 2,058,827

INTERNAL COMBUSTION ENGINE OF THE LIQUID FUEL INJECTION COMPRESSION IGNITION TYPE

Harry Ralph Ricardo, London, England

Application June 28, 1935, Serial No. 28,965
In Great Britain June 29, 1934

11 Claims.  (Cl. 123—32)

This invention relates to internal combustion engines of the liquid fuel injection compression ignition type in which during the compression stroke an air charge is forced into a combustion chamber of circular cross-section in planes at right angles to an axis in such a manner as to cause the air charge in the combustion chamber at the end of the compression stroke to be in a state of rotation as a whole about such axis, fuel being injected into this rotating air charge.

In an internal combustion engine of the above type according to the present invention there is combined with a combustion chamber having a maximum diameter at least 50% greater than its length measured along the axis, a liquid fuel injection device situated in a cooled part of the combustion chamber wall and adapted to deliver a jet of fuel in a direction lying in a plane normal or substantially normal to the combustion chamber axis and one or more restricted passages constituting a communication between the combustion chamber and the cylinder bore and so formed and arranged that air entering the combustion chamber therethrough during the compression stroke will enter the combustion chamber in a direction having a substantial component parallel to the chamber axis and a substantial component tangential to a circle having the axis for centre, so as to cause the charge in the combustion chamber at the end of the compression stroke to be in a state of rotation as a whole about the axis.

Preferably the combustion chamber has substantially flat end walls and its diameter in planes normal to the axis increases progressively from the planes in which the end walls lie towards a part of maximum diameter situated approximately midway between the end walls, the parts of the walls extending between the end walls and the part of maximum diameter viewed in cross-sections containing the axis being either concave, conical, polygonal or partly concave and partly flat.

In a convenient arrangement the axis of the combustion chamber is parallel or substantially parallel to the axis of the cylinder bore but it may of course be otherwise arranged, for example, with its axis inclined to that of the cylinder, as may be convenient when the face of the cylinder head which lies over the end of the cylinder bore is of the domed or conical type. In any case the restricted passage or passages are conveniently formed in a wall or member lying between the end of the cylinder bore and the adjacent end of the combustion chamber, and such passage or passages may be formed in a member which is constructed of heat-resisting material and is arranged, as by having limited contact with the adjacent cooled walls, so as to restrict the flow of heat from the member to such cooled walls and thereby cause the member to attain a high temperature during normal operation of the engine.

The number, disposition and form of the restricted passage or passages may vary but in one arrangement two or more similar restricted passages are provided and may be spaced apart circumferentially to a substantial extent about the combustion chamber axis. The restricted passages are preferably of circular cross-section and straight but may be of other cross-sections and either straight or curved.

The fuel injection device is preferably of a kind which delivers a hollow cone of spray, although other forms of injection device, for example, one delivering a solid cone of spray, may be employed.

The invention may be applied to engines of the type in question in which substantially as large a proportion of the air charge as is practicable while allowing for the necessary mechanical clearances is forced into the combustion chamber at the end of the compression stroke or in which the arrangement is such that the portion of the air charge contained in the combustion chamber and the passage or passages leading thereto from the cylinder bore does not exceed 50% by volume of the whole air charge at the end of the compression stroke.

Figure 2:
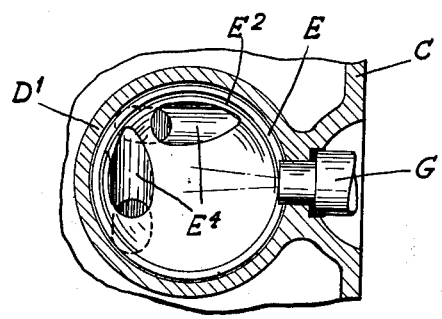
Figure 3:
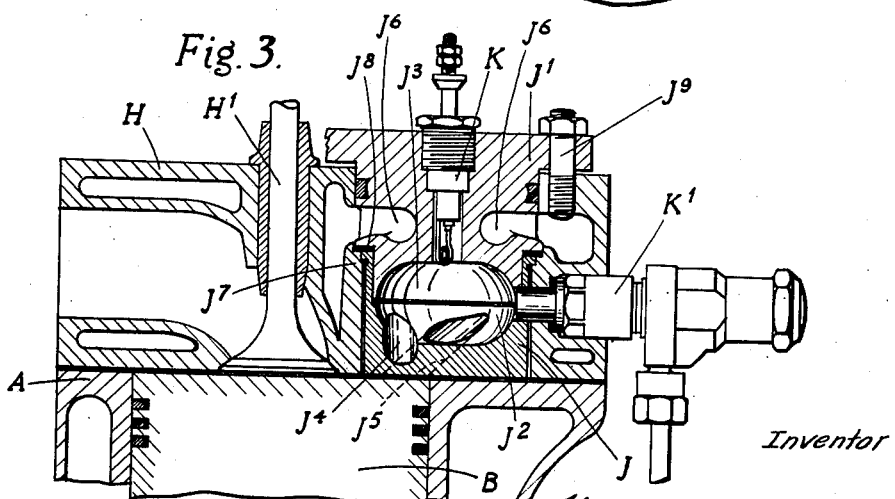
Figure 4:
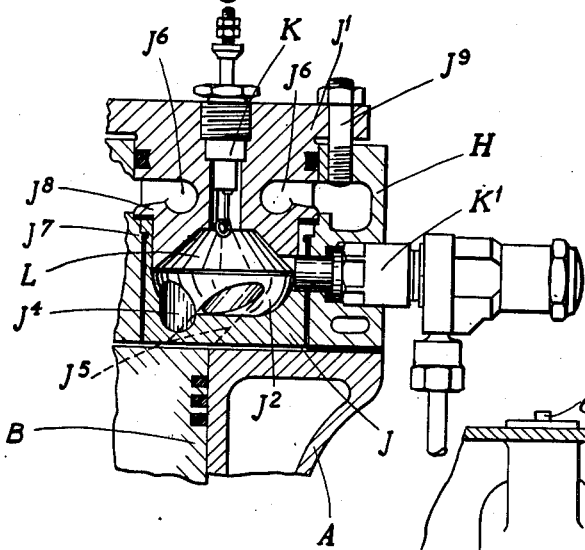
Figure 6:
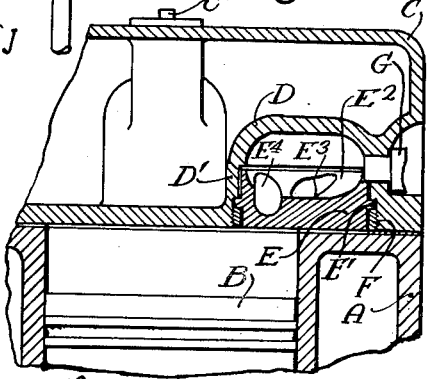
Figure 5:
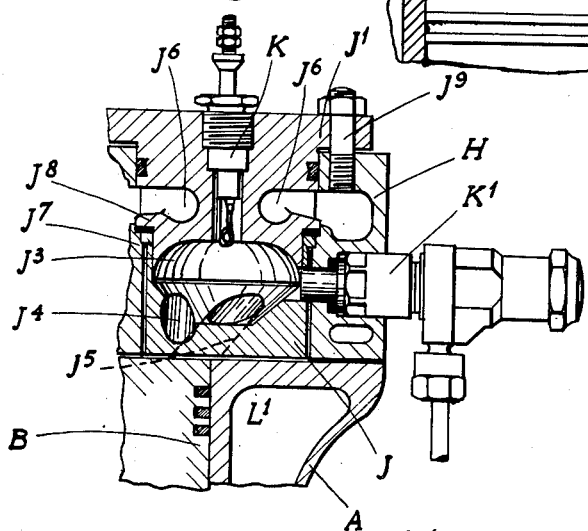

The invention may be carried into practice in various ways and may be applied to engines operating on either the two-stroke or four-stroke cycle and either of the water-cooled, air-cooled or other type, but four alternative constructions according to the invention as applied to four-stroke engines are illustrated by way of example in the accompanying drawings, in which Figure 1 is a sectional side elevation of the top of the cylinder and of the cylinder head of an engine according to the invention, Figure 2 is a section on the line 2—2 of Figure 1, Figure 3 is a similar view to Figure 1 of an alternative construction according to the invention, Figure 4 is a sectional side elevation of part of the top of the cylinder and of the part of the cylinder head containing the combustion chamber of a still further construction according to the invention, Figure 5 is a similar view to Figure 4 of another construction according to the invention, and Figure 6 is a view corresponding to Figure 1 but illustrating the application of the invention to a different type of engine.

In the construction illustrated in Figures 1 and 2 the engine comprises a water-cooled cylinder A containing a piston B and having a detachable water-cooled cylinder head C closing its outer end. The cylinder head has formed therein inlet and exhaust ports controlled by poppet valves indicated at $C^1$ and a combustion chamber pocket D which is of circular cross-sections in planes at right angles to the cylinder axis and has its axis parallel to the cylinder axis, the combustion chamber pocket having a substantially cylindrical mouth portion $D^1$ lying partly to one side of and overlapping the cylinder bore.

Mounted in the cylindrical mouth portion $D^1$ is a pluglike member E formed of heat-resisting material and having a narrow circumferential flange $E^1$ which abuts against a shoulder in the mouth portion and is held in place by a screw-threaded ring F formed of a non-ferrous metal and engaging a screw-thread in the mouth. The external diameter of the plug-like member E is such in relation to the diameter of the mouth portion of the pocket that contact between the member E and the cooled wall surrounding it is limited substantially to that between the flange $E^1$ and the shoulder against which it is held.

The end of the member E remote from the cylinder bore lies adjacent to a shallow internal shoulder in the combustion chamber pocket D and has formed therein a recess $E^2$, which is of circular cross-section in planes at right angles to the axis of the pocket, has a substantially flat base $E^3$ and constitutes the lower half of the combustion chamber proper, the upper half of which is of similar shape and is constituted by the upper end portion of the pocket D, as shown.

The formation of the recess $E^3$ in the plug E and of the upper end of the pocket D is such as to provide a combustion chamber which is as shown of circular cross-section in planes at right angles to the axis of the pocket and has a maximum diameter which is more than 50% greater than the distance between its flat ends, the circumferential wall of the combustion chamber viewed in cross-sections containing the axis being concave and substantially semi-circular. In the construction actually shown the maximum diameter of the combustion chamber is equal to approximately one-and-three-quarter times the distance between the flat combustion chamber ends.

Formed in the plug-like member E so as to extend between the interior of the combustion chamber and the cylinder bore are two substantially straight restricted passages $E^4$, which are displaced from one another circumferentially about the axis of the plug. Each of these restricted passages $E^4$ enters the combustion chamber as shown adjacent to its circumference and extends in a direction which is inclined to planes normal to the axis of the plug and has a substantial component tangential to a circle having such axis for centre so that the charge forced through the passages $E^4$ during the compression stroke of the engine will enter the combustion chamber with an axial and a tangential component and the charge in the combustion chamber at the end of the compression stroke will thus be in a state of rotation about the combustion chamber axis.

In the construction illustrated each passage $E^4$ is of circular cross-section and has a diameter which is equal to approximately a quarter of the maximum diameter of the combustion chamber.

Mounted in the cooled circumferential wall of the combustion chamber is a fuel injection device G adapted to deliver a hollow cone of spray having an axis which lies in a plane normal to the axis of the combustion chamber and situated approximately midway between the combustion chamber ends. In the construction illustrated, the axis of this spray is substantially radial with respect to the axis of the combustion chamber but this axis may be displaced somewhat in a plane normal to the combustion chamber axis so as to have a component either in the direction of rotation of the part of the air charge adjacent to the sprayer or in the opposite direction.

In the alternative construction illustrated in Figure 3 the engine comprises a cylinder A containing a piston B and closed at its outer end by a cylinder head H having inlet and exhaust passages therein controlled by poppet valves as indicated as regards one of the valves at $H^1$. The cylinder head is water-cooled as shown and is provided with a bore which extends therethrough and is adapted to receive two plug-like members $JJ^1$, the lower end portion of the plug-like member $J^1$ extending some distance within a recess in the upper end portion of the lower plug J. The adjacent end faces of the two plug-like members are provided with cup-like recesses $J^2J^3$, which together form a combustion chamber corresponding in shape and general disposition to the combustion chamber in the construction shown in Figures 1 and 2. It will also be seen that the lower plug-like member J lies partly to one side of and partly overlaps the cylinder bore in a similar manner to the plug-like member E in the construction shown in Figures 1 and 2 and the plug-like member J has formed therein two substantially straight restricted passages indicated at $J^4J^5$ arranged similarly to the passages $E^4$ in the construction shown in Figures 1 and 2 so that the charge forced through these passages into the combustion chamber during the compression stroke will have a component which is tangential and a component which is axial in relation to the combustion chamber.

The upper plug-like member $J^1$ is provided with a series of radially extending closed-ended cooling passages $J^6$ which communicate with the water jacket formed in the cylinder head so that the upper part of the plug $J^1$ is water-cooled, and extending through the plug $J^1$ at a point between the inner ends of the radial passages is a bore in which is situated an igniter K of the hot wire type intended to facilitate starting of the engine from cold. In some cases instead of the arrangement being as shown the arrangement may be such that while the upper part of the plug $J^1$ is cooled the lower part which constitutes the upper wall of the combustion chamber may be heat-insulated from the plug member J, for example by providing an air gap between the parts of the members J and $J^1$ which overlap. Alternatively a heat-insulating liner may be provided for the upper part of the combustion chamber.

Arranged in the cylinder head is a fuel injection device $K^1$ adapted to deliver a hollow cone of spray having an axis which lies in a plane normal to the axis of the combustion chamber and is situated approximately midway between the combustion chamber ends.

As shown, the lower plug J is provided adjacent to its upper end with a shallow radial flange which seats on a shoulder $J^7$ in the bore in the cylinder head, this plug being held in place by a corresponding shoulder $J^6$ on the upper plug, the upper plug being secured to the cylinder head by bolts $J^9$ passing through a flange formed on its upper end where it extends above the top of the cylinder head.

The alternative construction illustrated in Figure 4 is generally similar to that illustrated in Figure 3 except that a frusto-conical recess L is provided in the lower end of the upper plug $J^1$ instead of a recess having the form of that designated by the reference letter $J^3$ in Figure 3.

The alternative construction illustrated in Figure 5 is also similar to that illustrated in Figure 3 except that the upper face of the lower plug J has a frusto-conical recess $L^1$ formed therein instead of a recess of the shape of that designated by the reference letter $J^2$ in Figure 3.

In each of the constructions illustrated the fuel injection device is preferably of the kind which delivers a hollow cone of spray.

Further, in the constructions illustrated, the engine is of the kind in which substantially as large a proportion of the air charge as is practicable while maintaining the necessary mechanical clearances is forced into the combustion chamber at the end of the compression stroke. It is to be understood, however, that the invention may also be applied to engines in which the portion of the air charge contained in the combustion chamber and the passage or passages leading from it into the cylinder bore does not exceed 50% by volume of the whole air charge at the end of the compression stroke. Such an arrangement is illustrated in Figure 6 in which the piston $B^1$ is shown in the position which it occupies at the end of the compression stroke, the remaining reference characters being the same as those applied to the identical construction shown in Figure 1.

Further, the form of the combustion chamber may be modified within the limits specified and although in the constructions illustrated two restricted passages extend between the combustion chamber and the cylinder bore, it is to be understood that one or more such passages may be provided and that where two or more passages are provided, these may either be unequally spaced around the axis of the combustion chamber as in the constructions shown, or may be equally spaced about this axis where the position of the combustion chamber relatively to the cylinder bore permits such an arrangement, as for example when the invention is applied to an engine operating on the two-stroke cycle.

What I claim is:

1. In an internal combustion engine of the liquid fuel injection compression ignition type, in combination, a cylinder, valved inlet and exhaust ports opening directly into said cylinder, a combustion chamber of substantially circular cross-section in planes at right angles to an axis and having a maximum diameter at least 50% greater than its length measured along the axis, a liquid fuel injection device situated in a cooled part of the combustion chamber wall and adapted to deliver a jet of fuel in a direction lying in a plane substantially normal to the combustion chamber axis, and means for establishing communication between the combustion chamber and the cylinder so formed and arranged that the air forced into the combustion chamber during the compression stroke will enter the combustion chamber in a direction having a substantial component parallel to the axis of the chamber, and a substantial component tangential to a circle having such axis for centre so as to cause the charge in the combustion chamber at the end of the compression stroke to be in a state of rotation as a whole about the axis.

2. An internal combustion engine of the liquid fuel injection compression ignition type as claimed in claim 1, in which the combustion chamber has substantially flat end walls and its diameter in planes normal to the axis increases progressively from the planes in which the end walls lie towards a part of maximum diameter situated approximately midway between the end walls.

3. An internal combustion engine of the liquid fuel injection compression ignition type as claimed in claim 1, in which the combustion chamber has substantially flat end walls and side walls which, when viewed in cross-sections containing the axis, are substantially semi-circular.

4. In an internal combustion engine of the liquid fuel injection compression ignition type, in combination, a cylinder, valved inlet and exhaust ports opening directly into said cylinder, a combustion chamber of substantially circular cross-section in planes at right angles to an axis and having a maximum diameter at least 50% greater than its length measured along the axis, a liquid fuel injection device situated in a cooled part of the combustion chamber wall and adapted to deliver a jet of fuel in a direction lying in a plane substantially normal to the combustion chamber axis, a member lying between the combustion chamber and the end of the cylinder, and means for establishing communication between the combustion chamber and the cylinder bore provided in the said member in such a manner that the air forced into the combustion chamber during the compression stroke will enter the combustion chamber in a direction having a substantial component parallel to the axis of the chamber, and a substantial component tangential to a circle having such axis for centre so as to cause the charge in the combustion chamber at the end of the compression stroke to be in a state of rotation as a whole about the axis.

5. An internal combustion engine of the liquid fuel injection compression ignition type as claimed in claim 4, in which the member is constructed of heat-resisting material and is arranged by having limited contact with the adjacent cooled walls, so that the flow of heat from the member to such cooled walls is restricted.

6. In an internal combustion engine of the liquid fuel injection compression ignition type, in combination, a cylinder, valved inlet and exhaust ports opening directly into said cylinder, a combustion chamber of substantially circular cross-section in planes at right angles to an axis and having a maximum diameter at least 50% greater than its length measured along the axis, a liquid fuel injection device situated in the wall of the combustion chamber and adapted to deliver a jet of fuel in a direction lying in a plane substantially normal to the combustion chamber axis, and two passages constituting a communication between the combustion chamber and the cylinder, the two passages being spaced apart circumferentially to a substantial extent about the combustion chamber axis and being so formed and arranged that the air forced into the combustion chamber therethrough during the compression stroke will enter the said chamber in a direction having a substantial component parallel to the axis of the chamber, and a substantial component tangential to a circle having such axis for centre so as to cause the charge in the combustion chamber at the end of the compression stroke to be in a state of rotation as a whole about the axis.

7. An internal combustion engine of the liquid fuel injection compression ignition type as claimed in claim 1, in which said means comprises at least one restricted passage and the proportion of the air charge forced into the combustion chamber through said restricted passage or passages during the compression stroke is substantially the maximum which is practicable after the necessary mechanical clearances have been allowed for.

8. An internal combustion engine of the liquid fuel injection compression ignition type as claimed in claim 1, in which the arrangement is such that the portion of the air charge which at the end of the compression stroke remains within the cylinder space is not less than 50% by volume of the total air charge.

9. In an internal combustion engine of the liquid fuel injection compression ignition type, in combination, a cylinder, valved inlet and exhaust ports opening directly into said cylinder, a combustion chamber of substantially circular cross-section in planes at right angles to an axis and having a maximum diameter at least 50% greater than its length measured along the axis, a liquid fuel injection device situated in a cooled part of the combustion chamber wall and adapted to deliver a jet of fuel in a direction lying in a plane substantially normal to the combustion chamber axis, and means for establishing communication between the combustion chamber and the cylinder, said means formed in one of the end walls of said chamber, i. e., in one of the walls lying normal to the chamber axis, and so arranged that the air forced into the combustion chamber during the compression stroke will enter the combustion chamber in a direction having a substantial component parallel to the axis of the chamber, and a substantial component tangential to a circle having such axis for centre so as to cause the charge in the combustion chamber at the end of the compression stroke to be in a state of rotation as a whole about the axis.

10. In an internal combustion engine of the liquid fuel injection compression ingnition type, in combination, a cylinder, valved inlet and exhaust ports opening directly into said cylinder, a combustion chamber of substantially circular cross-section in planes at right angles to an axis and having a maximum diameter at least 50% greater than its length measured along the axis, a liquid fuel injection device situated in a cooled part of the combustion chamber wall and adapted to deliver a jet of fuel in a direction lying in a plane substantially normal to the combustion chamber axis, and at least one passageway for establishing communication between the combustion chamber and the cylinder so formed and arranged that the air forced into the combustion chamber during the compression stroke will enter the combustion chamber in a direction having a substantial component parallel to the axis of the chamber, and a substantial component tangential to a circle having such axis for centre so as to cause the charge in the combustion chamber at the end of the compression stroke to be in a state of rotation as a whole about the axis, said fuel injecting device disposed out of alignment with any passageway communicating with said chamber, directed toward an imperforate wall of said chamber, and so as to deliver the jet of fuel across the path of the rotating body of air.

11. In an internal combustion engine of the liquid fuel injection compression ignition type, in combination, a cylinder, valved inlet and exhaust ports opening directly into said cylinder, a combustion chamber of substantially circular cross-section in planes at right angles to an axis and having a maximum diameter at least 50% greater than its length measured along the axis, said combustion chamber partially overlapping said cylinder, a liquid fuel injection device situated in a cooled part of the combustion chamber wall and adapted to deliver a jet of fuel in a direction lying in a plane substantially normal to the combustion chamber axis, and means comprising a plurality of restricted passageways all disposed at one side of the axis of said chamber where said chamber overlaps said cylinder, for establishing communication between the combustion chamber and the cylinder, said passageways so formed and arranged that the air forced into the combustion chamber during the compression stroke will enter the combustion chamber in a direction having a substantial component parallel to the axis of the chamber, and a substantial component tangential to a circle having such axis for centre so as to cause the charge in the combustion chamber at the end of the compression stroke to be in a state of rotation as a whole about the axis.

HARRY RALPH RICARDO.